(12) United States Patent
Lee et al.

(10) Patent No.: US 12,135,586 B2
(45) Date of Patent: Nov. 5, 2024

(54) DISPLAY DEVICE AND METHOD FOR MANUFACTURING THE SAME

(71) Applicant: Samsung Display Co., LTD., Yongin-si (KR)

(72) Inventors: Young Myung Lee, Hwaseong-si (KR); Jong Nam Lee, Hwaseong-si (KR); Jin Hyuk Park, Hwaseong-si (KR); Wook Jae Lee, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 176 days.

(21) Appl. No.: 17/869,341

(22) Filed: Jul. 20, 2022

(65) Prior Publication Data
US 2023/0139381 A1    May 4, 2023

(30) Foreign Application Priority Data
Oct. 28, 2021    (KR) .......................... 10-2021-0145338

(51) Int. Cl.
  *G06F 1/16*    (2006.01)
  *G02F 1/13357*    (2006.01)

(52) U.S. Cl.
  CPC ...... *G06F 1/1652* (2013.01); *G02F 1/133608* (2013.01); *G06F 1/1616* (2013.01)

(58) Field of Classification Search
  None
  See application file for complete search history.

(56) References Cited

U.S. PATENT DOCUMENTS

2020/0401185 A1*    12/2020    Won .................... G06F 1/1626

FOREIGN PATENT DOCUMENTS

| CN | 113066370 A | * | 7/2021 |
|----|-------------|---|--------|
| KR | 1020140010919 | | 1/2014 |
| KR | 1020140139361 | | 12/2014 |
| KR | 1020200145934 | | 12/2020 |

* cited by examiner

*Primary Examiner* — Phu Vu
(74) *Attorney, Agent, or Firm* — CANTOR COLBURN LLP

(57) ABSTRACT

A display device in which a flat area, a first bent area disposed on a side in a first direction of the flat area, and a second bent area disposed on a side in a direction opposite to the first direction of the flat portion are defined includes a display panel including portions respectively overlapping the flat area, the first bent area, the second bent area, each of the portions of the display panel includes a first surface and a second surface opposite to the first surface, and a support film disposed on the second surface of the display panel. A portion of the support film overlapping the flat area has a first thickness. A portion of the support film overlapping each of the first bent area and the second bent area has a second thickness smaller than the first thickness.

19 Claims, 14 Drawing Sheets

PF: PF1, PF2

PF: PF1, PF2

DISPLAY DEVICE AND METHOD FOR MANUFACTURING THE SAME

This application claims priority to Korean Patent Application No. 10-2021-0145338 filed on Oct. 28, 2021, and all the benefits accruing therefrom under 35 U.S.C. § 119, the content of which in its entirety is herein incorporated by reference.

BACKGROUND

1. Field

Embodiments of the invention relate to a display device and a method for manufacturing the display device.

2. Description of Related Art

Display devices are increasing in importance under development of multimedia. Accordingly, various types of the display devices such as a liquid crystal display ("LCD") device, an organic light-emitting display device, etc., are being used.

The organic light-emitting display device displays an image using an organic light-emitting diode ("OLED") that generates light via recombination of electrons and holes. The organic light-emitting display device has fast response speed, high luminance, a large viewing angle, and may operate with low power consumption.

The display device generally displays an image only on a front surface thereof. However, recently, a display device that also displays an image on a side portion thereof is being developed.

SUMMARY

Embodiments of the invention provide a display device in which a bubble size in an adhesive member between a cover window and a display panel is reduced and a crack in the display panel is prevented.

Features according to the invention are not limited to the above-mentioned embodiments. Other features and advantages according to the invention that are not mentioned may be understood based on following descriptions, and may be more clearly understood based on embodiments according to the invention. Further, it will be easily understood that the features and advantages according to the invention may be realized using means shown in the claims and combinations thereof.

An embodiment of the invention provides a display device in which a flat area, a first bent area disposed on a side in a first direction of the flat area, a second bent area disposed on a side in a direction opposite to the first direction of the flat area are defined includes a display panel including portions respectively overlapping the flat area, the first bent area, and the second bent area, each of the portions of the display panel including a first surface and a second surface opposite to the first surface, and a support film is disposed on the second surface of the display panel. A portion of the support film overlapping the flat area has a first thickness, and a portion of the support film overlapping each of the first bent area and the second bent area has a second thickness smaller than the first thickness.

Another embodiment of the invention provides a display device in which a flat area, a first bent area disposed on a side in a first direction of the flat area, a second bent area disposed on a side in a direction opposite to the first direction of the flat area are defined includes a display panel including portions respectively overlapping the flat area, the first bent area, and the second bent area, each of the portions of the display panel including a first surface and a second surface opposite to the first surface, a cover window disposed on the first surface of the display panel and including portions respectively overlapping the flat area, the first bent area, and the second bent area. The support film is disposed on the second surface of the display panel. A portion of the support film overlapping the flat area has a first thickness, and a portion of the support film overlapping each of the first bent area and the second bent area has a second thickness smaller than the first thickness.

Still another embodiment of the invention provides a display device in which a flat area, a first bent area disposed on a side in a first direction of the flat area, a second bent area disposed on a side in a direction opposite to the first direction of the flat area, a third bent area disposed on a side in a second direction intersecting the first direction of the flat area, and a fourth bent area disposed on a side in a direction opposite to the second direction of the flat area are defined includes a display panel including portions respectively overlapping the flat area, and the first to fourth bent areas, each of the portions of the display panel including a first surface and a second surface opposite to the first surface, and a support film disposed on the second surface of the display panel. A portion of the support film overlapping the flat area has a first thickness, and a portion of the support film overlapping each of the first bent area and the second bent area has a second thickness smaller than the first thickness.

Specific details of other embodiments are included in detailed descriptions and drawings.

By embodiments of the invention, the bubble size in the adhesive member between the cover window and the display panel may be reduced, and the cracks in the display panel may be prevented.

Effects of the invention are not limited to the above-mentioned effects, and other effects as not mentioned will be clearly understood by those skilled in the art from following descriptions.

BRIEF DESCRIPTION OF DRAWINGS

The above and other features and features of the invention will become more apparent by describing in detail embodiments thereof with reference to the attached drawings, in which.

DETAILED DESCRIPTIONS

Figure 1:
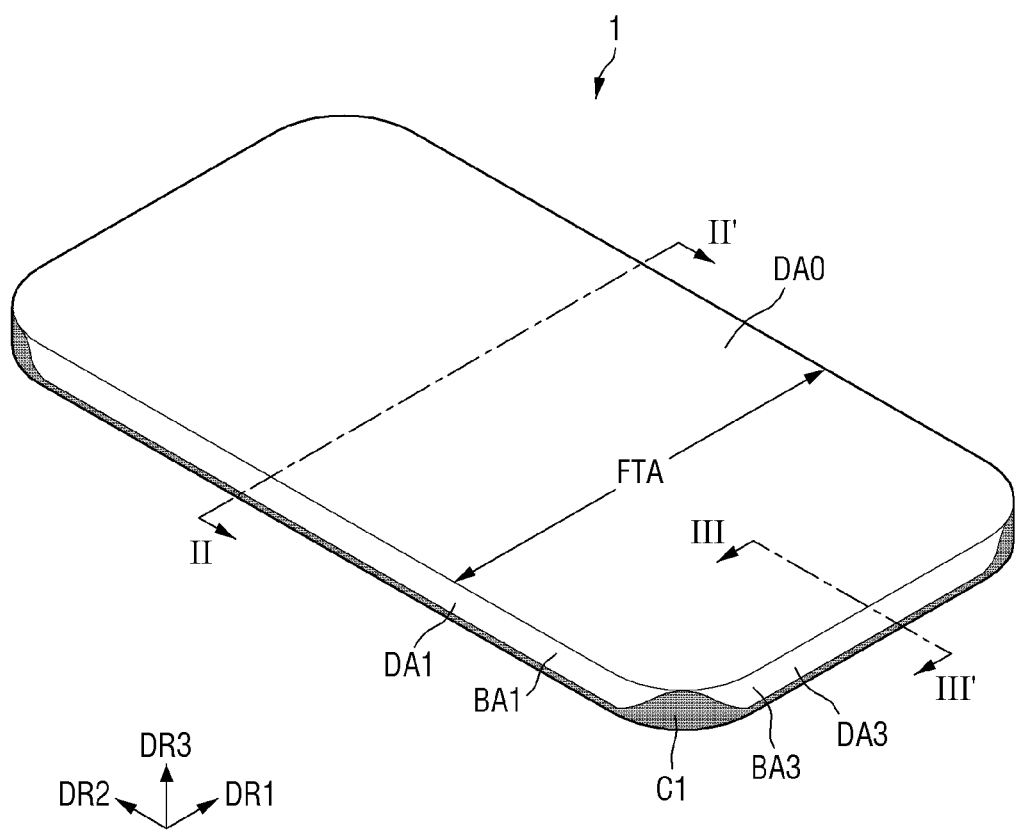
FIG. 1 is a perspective view of an embodiment of a display device.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the disclosure, numerous specific details are set forth in order to provide a thorough understanding of the disclosure. However, it will be understood that the disclosure may be practiced without these specific details. In other instances, well-known methods, procedures, components, and circuits have not been described in detail so as not to unnecessarily obscure features of the invention. Examples of various embodiments are illustrated and described further below. It will be understood that the description herein is not intended to limit the claims to the illustrative embodiments described. On the contrary, it is intended to cover alternatives, modifications, and equivalents as may be included within the spirit and scope of the invention as defined by the appended claims.

A shape, a size, a ratio, an angle, a number, etc. disclosed in the drawings for describing embodiments of the disclosure are exemplary, and the invention is not limited thereto. The same reference numerals refer to the same elements herein. Further, descriptions and details of well-known steps and elements are omitted for simplicity of the description. Furthermore, in the following detailed description of the disclosure, numerous specific details are set forth in order to provide a thorough understanding of the disclosure. However, it will be understood that the disclosure may be practiced without these specific details. In other instances, well-known methods, procedures, components, and circuits have not been described in detail so as not to unnecessarily obscure features of the disclosure.

The terminology used herein is for the purpose of describing particular embodiments only and is not intended to limit the invention. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D", this means C inclusive to D inclusive unless otherwise specified.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the invention.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like may be disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like may be disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

When an illustrative embodiment may be implemented differently, a function or operation specified in a specific block may occur in a sequence different from that specified in a flowchart. For example, two consecutive blocks may actually be executed at the same time. Depending on a related function or operation, the blocks may be executed in a reverse sequence.

In descriptions of temporal relationships, for example, temporal precedent relationships between two events such as "after", "subsequent to", "before", etc., another event may occur therebetween unless "directly after", "directly subsequent" or "directly before" is not indicated. The features of the various embodiments of the disclosure may be partially or entirely combined with each other, and may be technically associated with each other or operate with each other. The embodiments may be implemented independently of each other and may be implemented together in an association relationship. Spatially relative terms, such as "beneath," "below," "lower," "under," "above," "upper," and the like, may be used herein for ease of explanation to describe one element or feature's relationship to another element or feature as illustrated in the drawing figures. It will be understood that the spatially relative terms are intended to encompass different orientations of the device in use or in operation, in addition to the orientation depicted in the drawing figures. For example, when the device in the drawings may be turned over, elements described as "below" or "beneath" or "under" other elements or features would then be oriented "above" the other elements or features. Thus, the example terms "below" and "under" may encompass both an orientation of above and below. The device may be otherwise oriented for example, rotated 90 degrees or at other orientations, and the spatially relative descriptors used herein should be interpreted accordingly.

Terms "first direction DR1", "second direction DR2" and "third direction DR3" as used herein should not be interpreted only to have a geometric relationship in which the first direction, the second direction, and the third direction are perpendicular to each other. The "first direction DR1", "second direction DR2" and "third direction DR3" may be interpreted to have a broader direction within a range in which components herein may work functionally.

Hereinafter, detailed embodiments will be described with reference to the accompanying drawings.

Figure 2:
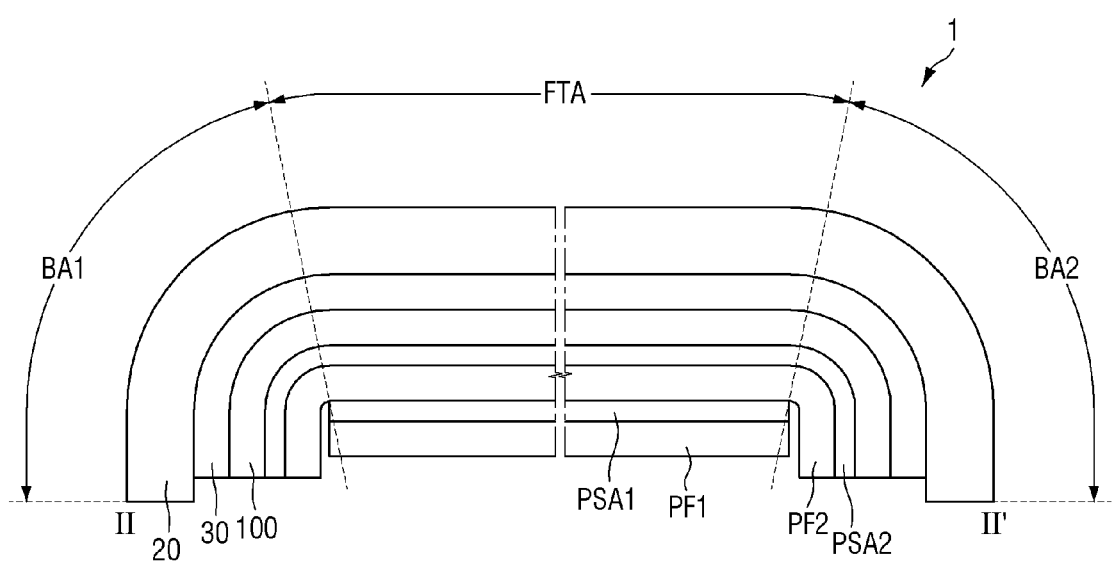
FIG. 2 is a cross-sectional view taken along line II-II' in FIG. 1.
Figure 3:
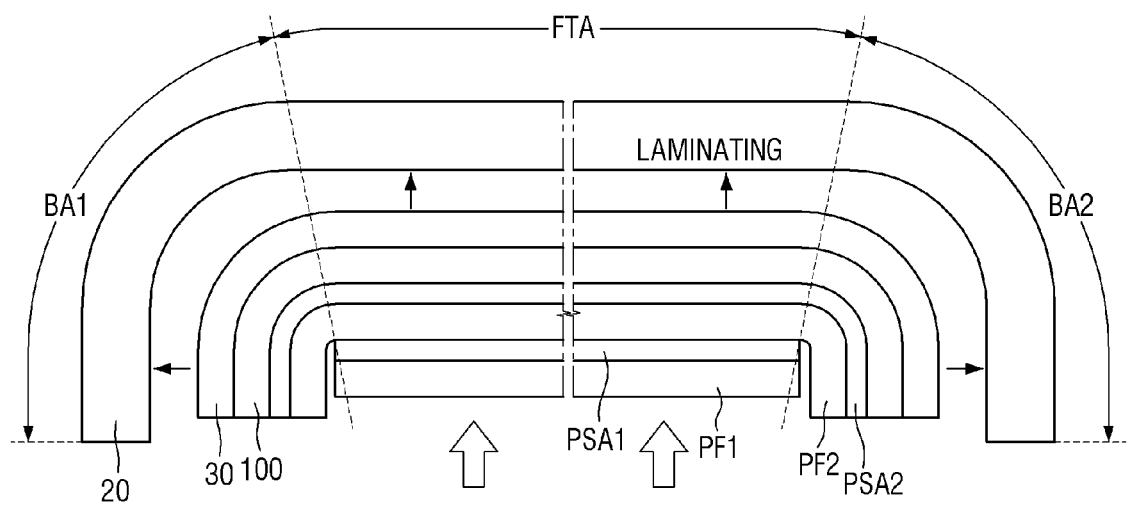
FIG. 3 is a schematic diagram showing a process of bonding a cover window and a display panel to each other in the display device according to FIG. 1.
Figure 3:
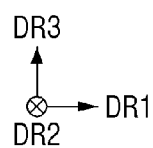
Figure 4:
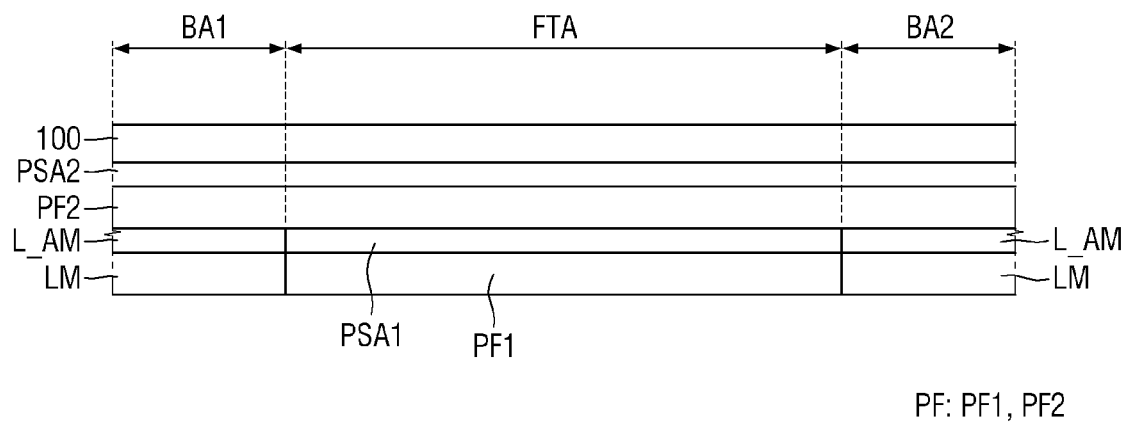
FIG. 4 is a cross-sectional view showing a case in which a release member and a release and adhesive member are attached in an unfolded state of the display device according to FIG. 1.
Figure 5:
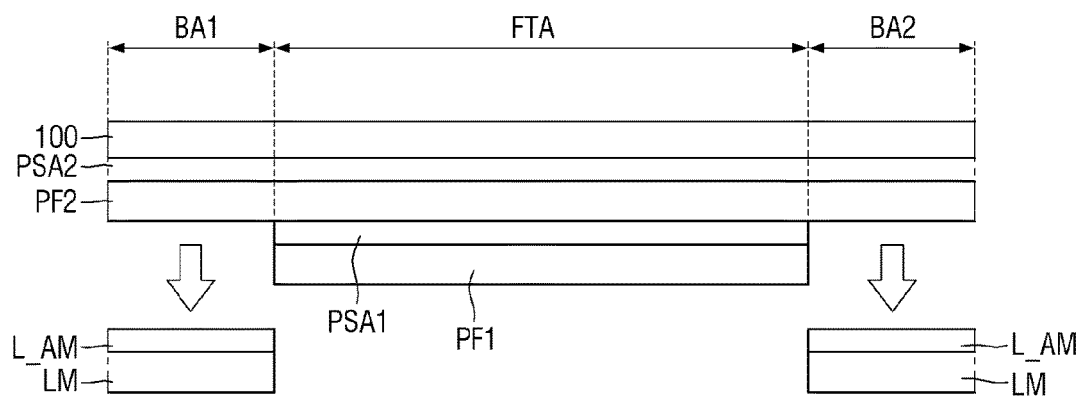
FIG. 5 is a schematic diagram showing a process of peeling the release member and the release and adhesive member.
Figure 6:
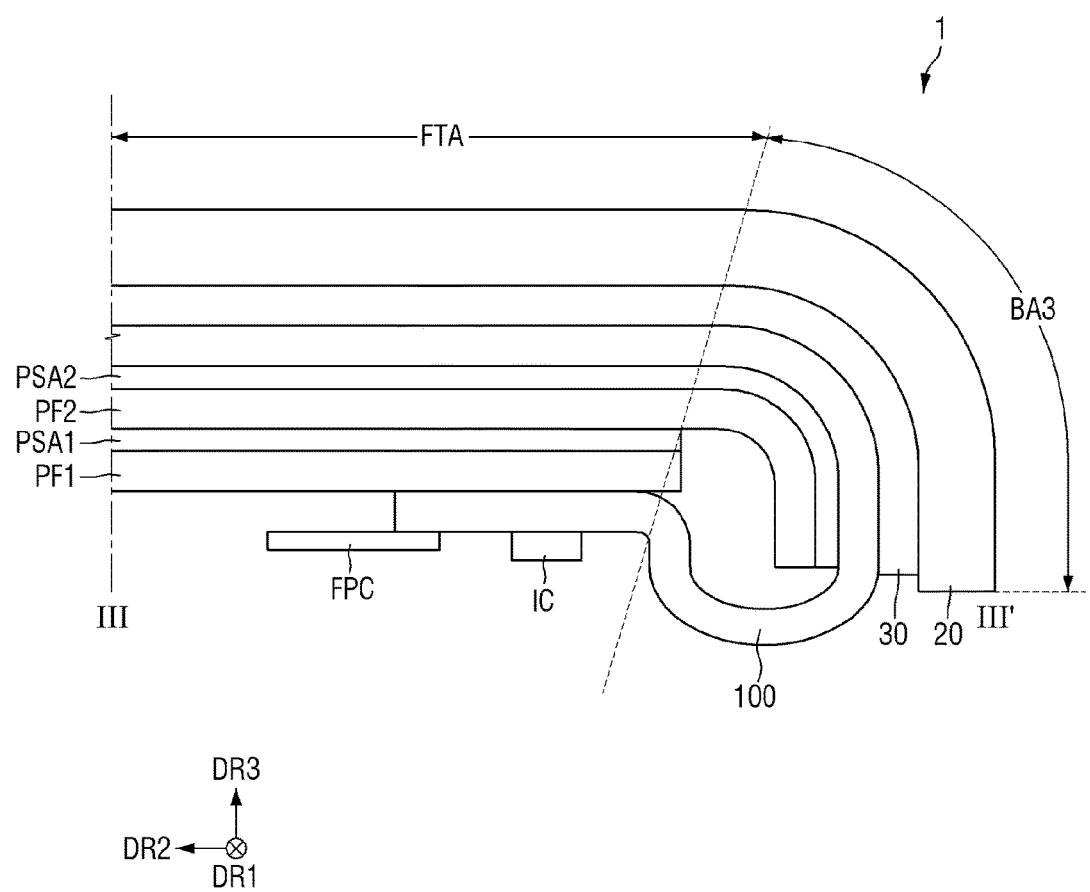
FIG. 6 is a cross-sectional view taken along line III-III' in FIG. 1.
Figure 7:
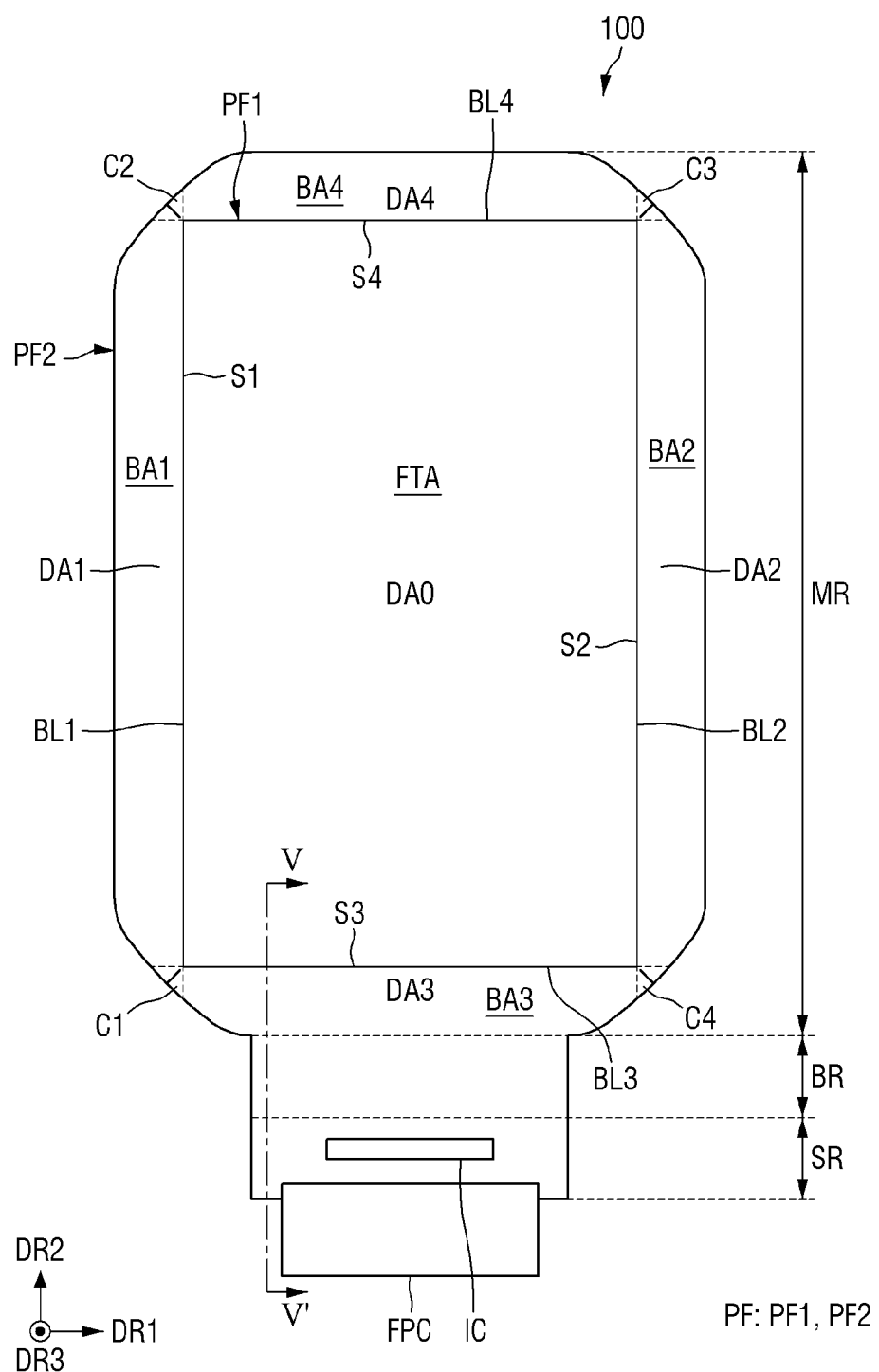
FIG. 7 is a plan view of an embodiment of a display panel and a support film.

FIG. 1 is a perspective view of an embodiment of a display device. FIG. 2 is a cross-sectional view taken along line II-II' in FIG. 1. FIG. 3 is a schematic diagram showing a process of bonding a cover window and a display panel to each other in the display device according to FIG. 1. FIG. 4 is a cross-sectional view showing a case in which a release member and a release and adhesive member are attached in an unfolded state of the display device according to FIG. 1. FIG. 5 is a schematic diagram showing a process of peeling the release member and the release and adhesive member. FIG. 6 is a cross-sectional view taken along line III-III' in FIG. 1. FIG. 7 is a plan view of an embodiment of a display panel and a support film.

Referring to FIG. 1 to FIG. 7, a display device 1 in an embodiment is a device that displays a moving image or a still image, and may include not only portable electronic devices such as a mobile phone, a smart phone, a tablet personal computer ("PC"), a smart watch, a watch phone, a mobile communication terminal, an electronic organizer, an e-book, a portable multimedia player ("PMP"), navigation, ultra-mobile PC ("UMPC"), etc., but also various devices that provide display screens such as televisions, laptops, monitors, billboards, internet of things ("IoT"), etc.

The display device 1 may include a front display area DA0, side display areas DA1, DA2, DA3, and DA4, and corner areas C1, C2, C3, and C4. The front display area DA0 and the side display areas DA1, DA2, DA3, and DA4 may be display areas for displaying an image.

The front display area DA0 may have a quadrangular (e.g., rectangular) shape including two short-sides S3 and S4 extending in the first direction DR1 and two long-sides S1 and S2 extending in the second direction DR2. A corner where the short-side and the long-side meet with each other may have a rounded polygonal shape. However, the invention is not limited thereto. In another embodiment, the corner may have an angled corner shape.

The side display areas DA1, DA2, DA3, and DA4 may include the first side display area DA1, the second side display area DA2, the third side display area DA3, and the fourth side display area DA4.

The first side display area DA1 extends from an edge of the front display area DA0 in a direction opposite to the first direction DR1, the second side display area DA2 extends from an edge of the front display area DA0 in the first direction DR1, the third side display area DA3 extends from an edge of the front display area DA0 in a direction opposite to the second direction DR2, and the fourth side display area DA4 extends from an edge of the front display area DA0 in the second direction DR2.

The first to fourth side display areas DA1, DA2, DA3, and DA4 may have substantially the same function or configuration except for their positions. Hereinafter, common features of the first to fourth side display areas DA1, DA2, DA3, and DA4 will be described based on the first side display area DA1, and duplicate descriptions thereof will be omitted.

The first side display area DA1 may extend outwardly from the edge of the front display area DA0 in a bent manner at a predefined angle. In an embodiment, the first side display area DA1 may be bent at an angle of about 90 degrees to about 150 degrees relative to the front display area DA0, for example. The first side display area DA1 may be a surface bent at a first bending line BL1 so as to have a predefined curvature. The first bending line BL1 may be a boundary between the front display area DA0 and the first side display area DA1.

Each of the first to fourth corner areas C1, C2, C3, and C4 may be disposed between adjacent ones of the first to fourth side display areas DA1, DA2, DA3, and DA4. The first to fourth corner areas C1, C2, C3, and C4 may have substantially the same function or configuration except for their positions. Hereinafter, common features of the first to fourth corner areas C1, C2, C3, and C4 will be described based on the first corner area C1, and duplicate descriptions thereof will be omitted.

The first corner area C1 may extend from the front display area DA0 and be rounded to have a predefined curvature. The first corner area C1 may be disposed between the first side display area DA1 and the third side display area DA3. One side of the first corner area C1 may contact the third side display area DA3, and another side of the first corner area C1 may contact the first side display area DA1. That is, an end of the first corner area C1 at which the one side of the first corner area C1 and the another side of the first corner area C1 meet may contact the first bending line BL1 and the third bending line BL3.

The display device 1 may include a display panel 100 and a cover window 20 disposed on the display panel 100. An adhesive member (also referred to as an adhesive layer) 30 for bonding the display panel 100 and the cover window 20 to each other may be further disposed between the display panel 100 and the cover window 20.

The cover window 20 may cover and protect the display panel 100. The cover window 20 may include a transparent material. The cover window 20 may include, for example, glass (or ultra-thin glass) or plastic. When the cover window 20 includes plastic, the cover window 20 may have a flexible property.

In an embodiment, plastics applicable to the cover window 20 may include polyimide, polyacrylate, polymethylmethacrylate ("PMMA"), polycarbonate, polyethylenenaphthalate ("PEN"), polyvinylidene chloride, polyvinylidene difluoride ("PVDF"), polystyrene, ethylene-vinylalcohol copolymer, polyethersulphone ("PES"), polyetherimide ("PEI"), polyphenylene sulfide ("PPS"), polyallylate, triacetyl cellulose ("TAC"), cellulose acetate propionate ("CAP"), or the like. The plastic window may include one or more of the plastic materials as listed above. When the cover window 20 includes plastic, a coating layer disposed on each of top and bottom surfaces of the plastic may be further included in the cover window. In an embodiment, the coating layer may be a hard coating layer including an organic layer and/or an organic/inorganic composite layer including an acrylate compound.

A planar shape of the cover window 20 corresponds to a shape of the display device 1 as applied. In an embodiment, when the display device 1 has a substantially quadrangular (e.g., rectangular) shape in a plan view, the cover window 20 also has a substantially quadrangular (e.g., rectangular) shape, for example. In another embodiment, when the display device 1 has a circular shape, the cover window 20 also has a circular shape. When the display device 1 includes the side display areas DA1, DA2, DA3, and DA4 and the corner areas C1, C2, C3, and C4, the cover window 20 may include side portions corresponding to the side display areas DA1, DA2, DA3, and DA4 and corner portions corresponding to the corner areas C1, C2, C3, and C4. Each of the side portion and the corner portion of the cover window 20 may have a curved surface. In this case, the curved surface may have a constant curvature or a varying curvature. A curvature of the corner portion may be greater than a curvature of the side portion.

The display panel 100 may be disposed under the cover window 20. The cover window 20 and the display panel 100 may be joined to each other via the adhesive member 30. The adhesive member 30 may be embodied as an optically cleared adhesive ("OCA") film, or a an optically cleared resin ("OCR").

The display panel 100 may be embodied as a light-emitting display panel including a light-emitting element. In an embodiment, the display panel 100 may include an organic light-emitting display panel that employs an organic light-emitting diode as a light-emitting element, a micro light-emitting diode display panel that employs a micro light-emitting diode (micro "LED") as a light-emitting element, and a quantum dot organic light-emitting display panel employing a quantum dot and an organic light-emitting diode, or an inorganic light-emitting display panel employing an inorganic semiconductor as a light-emitting element, for example. Hereinafter, descriptions will be based on an example that the display panel 100 is embodied as the organic light-emitting display panel.

The display panel 100 may include a flexible substrate including a flexible polymer material such as polyimide. Accordingly, the display panel 100 may be deformable such as bendable, foldable, or rollable.

The display panel 100 may include a bent area BR in which the panel is bent. The display panel 100 may be divided into a main area MR disposed on one side of the bent area BR and a sub-area SR disposed on another side of the bent area BR opposite to the one side of the bent area BR.

The front display area DA0 and the side display areas DA1, DA2, DA3, and DA4 of the display panel 100 are disposed in the main area MR. In an embodiment, peripheral edge portions of the side display areas DA1, DA2, DA3, and DA4 in the main area MR, an entirety of the bent area BR, and an entirety of the sub-area SR may be non-display areas. However, the invention is not limited thereto. In another embodiment, the bent area BR and/or the sub-area SR may include a display area.

The bent area BR may be extended from (or connected to) a side of the main area MR in a direction opposite to the second direction DR2. In an embodiment, the bent area BR may be extended from (or connected to) a bottom short-side of the main area MR, for example. That is, the bent area BR may be extended from (or connected to) an edge of the third side display area DA3. In this case, the third side display area DA3 may be disposed between the front display area DA0 and the bent area BR. The display panel 100 may be bent in a direction opposite to the third direction DR3 and along a third bending line BL3, or may be bent in the third direction DR3 and along the bent area BR.

The display panel 100 may be bent to have the same radius of curvature at the third bending line BL3 and the bent area BR. However, the invention is not limited thereto. In another embodiment, the display panel 100 may be bent to have different radii of curvature at the third bending line BL3 and the bent area BR. As the display panel 100 is bent at the third bending line BL3 and the bent area BR, surfaces of the display panel 100 may be inverted.

That is, when the display panel 100 is bent at the third bending line BL3, one surface of the display panel 100 facing upwardly in a flat state may be changed to face laterally and outwardly. Then, when the display panel 100 is further bent at the bent area BR, the surface facing laterally and outwardly may be changed to face downwardly.

The sub-area SR extends from the bent area BR. The sub-area SR may extend in a parallel manner to the main area MR after the bending has been completed. The sub-area SR may overlap the main area MR in the third direction DR3 in a bent state, that is, in a thickness direction of the display panel 100. A width of the sub-area SR in the second direction DR2 may be the same as a width of the bent area BR in the second direction DR2. However, the invention is not limited thereto.

A driver chip IC may be disposed in the sub-area SR. The driver chip IC may include an integrated circuit that drives the display panel 100. The integrated circuit may be embodied as a separate chip or may be integrated into one chip.

A pad may be disposed on an end of the sub-area SR of the display panel 100. The pad may include a plurality of display signal line pads and touch signal line pads. A driver board FPC may be extended from (or connected to) the pad of the end of the sub-area SR of the display panel 100. The driver board FPC may be embodied as a flexible printed circuit board or film.

In an embodiment, the display device 1 may further define a flat area FTA (or a flat portion) and bent areas BA1, BA2, BA3, and BA4 (or bent portions). The flat area FTA may be identical with the front display area DA0, and the bent areas BA1, BA2, BA3, and BA4 may be identical with the side display areas DA1, DA2, DA3, and DA4, respectively. Hereinafter, for convenience of description, an area of the display device 1 will be described based on the flat area FTA and the bent areas BA1, BA2, BA3, and BA4.

The display device 1 may further include a support film PF. The support film PF may include a plurality of films. In an embodiment, the support film PF may include a lower support film PF1 and an upper support film PF2, for example. The lower and upper support films PF1 and PF2 may be disposed under the display panel 100. The support films PF1 and PF2 may be disposed below the display panel 100 to support the display panel 100.

In an embodiment, the upper support film PF2 may be disposed in the flat area FTA and the bent areas BA1, BA2, BA3, and BA4 of the display device 1 and may not be disposed in the bent area BR and the sub-area SR of the display panel 100, for example. The upper support film PF2 may include at least one of a polyacrylic material, polyethyleneterephthalate ("PET"), polycarbonate, polyethersulfone ("PES"), polyethylenapthanate ("PEN"), and polynorbornene ("PNB"). However, the invention is not limited thereto.

The upper support film PF2 may be attached to the display panel 100 via an upper adhesive member (also referred to as a second inter-adhesive member) PSA2.

In an embodiment, the lower support film PF1 may have a smaller area than an area of the upper support film PF2 in a plan view. The lower support film PF1 may be disposed in the flat area FTA of the display device 1. The lower support film PF1 may not be disposed in the bent areas BA1, BA2, BA3, and BA4 of the display device 1 and the bent area BR and the sub-area SR of display panel 100. That is, the lower support film PF1 may overlap the front display area DA0, and may not overlap the side display areas DA1, DA2, DA3, and DA4.

The lower support film PF1 may include at least one of a polyacrylic material, PET, polycarbonate, PES, PEN, and PNB. However, the invention is not limited thereto.

As shown in FIG. 3, the display panel 100 may be attached or laminated to the cover window 20 spaced apart therefrom while the adhesive member 30 is attached to a top surface of the display panel 100. When the display panel 100 is attached to the cover window 20, the above-mentioned support film PF has been already attached to a bottom of the display panel 100. Further, the display panel 100, the support film PF, and the cover window 20 are disposed in the flat area FTA, and the bent areas BA1, BA2, BA3, and BA4, as described above with reference to FIG. 3. That is, in a state in which the bent areas BA1, BA2, BA3, and BA4 of the display panel 100 and the cover window 20 extend outwardly from an edge of the front display area DA0 of the display panel 100 and the cover window 20 so as to be bent at a predefined angle, the attachment between the 100 and the cover window 20 may be made.

In a process of attaching the display panel 100 and the cover window 20 to each other, a silicon pad may be disposed on a bottom of the display panel 100 (or on a top of the support film PF), and the display panel 100 may be raised up in the thickness direction using the silicon pad and then the display panel 100 may be attached to the cover window 20.

In a state in which the bent areas BA1, BA2, BA3, and BA4 of the display panel 100 and the cover window 20 extend outwardly from the edge of the front display area DA0 of the display panel 100 and the cover window 20 so as to be bent at a predefined angle, the attachment between the display panel 100 and the cover window 20 is made.

Further, a curvature of the bent area is small. Thus, due to stress of the display panel 100 generated at a boundaries of the bent areas BA1, BA2, BA3, and BA4 of the display panel 100, bubbles may be generated in the adhesive member 30 between the display panel 100 and the cover window 20. In addition, cracks may occur in the display panel 100 itself. The bubble generation in the adhesive member 30 and the crack generation in the display panel 100 itself are related to a thickness of the support film under the display panel 100, in particular, a thickness of a portion of the support film under the bent areas BA1, BA2, BA3, and BA4 of the display panel 100. To prevent the bubbles and cracks, an approach to lower the thickness of the support film itself may be present. However, in this case, handleability of the display panel 100 may be deteriorated.

In an embodiment, for prevention of deterioration in the handleability of the display panel 100, and the bubble generation suppression in the adhesive member 30 and suppression of crack generation in the display panel 100 itself in the bent areas BA1, BA2, BA3, and BA4 of the display panel 100, the upper support film PF2 may be disposed in the flat area FTA and the bent areas BA1, BA2, BA3, and BA4, while the lower support film PF1 may be disposed in the flat area FTA, but may not be disposed on the bent areas BA1, BA2, BA3, and BA4. The lower support film PF1 may be attached to the upper support film PF2 via a lower adhesive member PSA1, and the upper support film PF2 may be attached to the display panel 100 via an upper adhesive member PSA2. As shown in FIG. 7, a planar shape of the lower support film PF1 may be exactly the same as a planar shape of the flat area FTA. The upper support film PF2 is disposed not only in the flat area FTA, but also in the bent areas BA1, BA2, BA3, and BA4. Thus, a planar shape of the upper support film PF2 may include the flat area FTA and then protrude from the flat area FTA to the bent areas BA1, BA2, BA3, and BA4, compared to the planar shape of the lower support film PF1.

The lower support film PF1 may have a first thickness t1, and the upper support film PF2 may have a second thickness t2. In an embodiment, each of the first thickness t1 and the second thickness t2 may be in a range of about 30 micrometers (μm) to about 40 μm, and a sum of the first thickness t1 and the second thickness t2 may be in a range of about 60 μm to 80 μm. In an embodiment, the sum of the first thickness t1 and the second thickness t2 may be about 76 μm, and each of the first thickness t1 and the second thickness t2 may be about 38 μm, for example. That is, a thickness of about 76 μm as the sum of the first thickness t1 and the second thickness t2 may be substantially the same as a thickness of a conventional support film in in the flat area FTA and the bent areas BA1, BA2, BA3, and BA4.

A method for designing the upper support film PF2 disposed in the flat area FTA, and the bent areas BA1, BA2, BA3, and BA4, and the lower support film PF1 disposed in the flat area FTA and not disposed in the bent area BA1, BA2, BA3, and BA4 is described in detail in FIG. 4 and FIG. 5.

As shown in FIG. 4 and FIG. 5, in each of the bent areas BA1 and BA2, a release film LM and a release and adhesive member L_AM disposed between the release film LM and the upper support film PF2 are disposed under the upper support film PF2. While the release and adhesive member L_AM is removed from the upper support film PF2, the release film LM may be also removed together with the release and adhesive member L_AM from the upper support film PF2.

As described above, the upper support film PF2 is disposed in the flat area FTA and the bent areas BA1, BA2, BA3, and BA4, while the lower support film PF1 is disposed in the flat area FTA, but is not disposed in the bent areas BA1, BA2, BA3, and BA4. This may prevent deterioration of the handleability of the display panel 100, and may achieve suppression of bubble generation in the adhesive member 30 in the bent areas BA1, BA2, BA3, and BA4 of display panel 100 and suppression of crack generation in the display panel 100 itself.

Hereinafter, another embodiment will be described.

Figure 9:
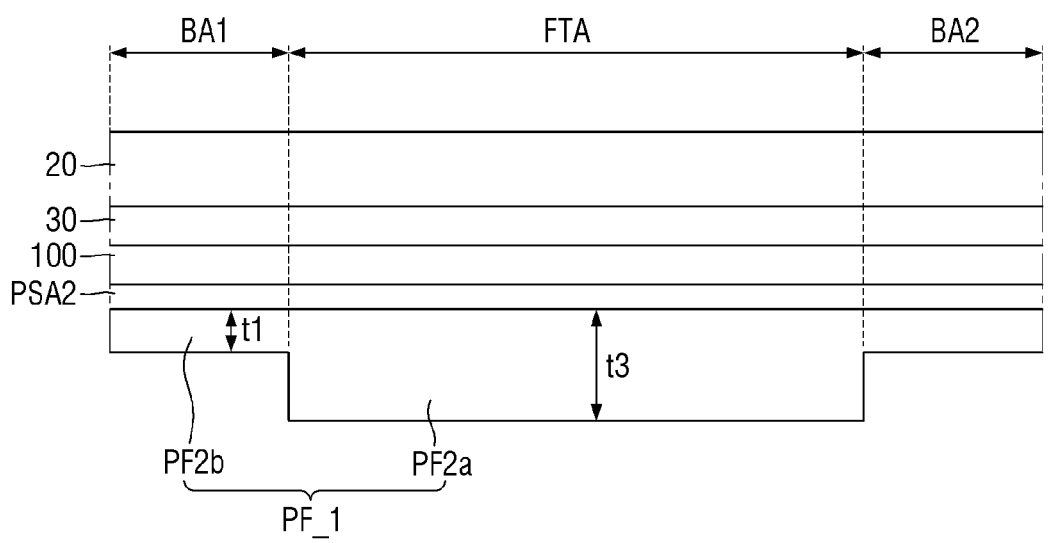
FIG. 9 is a cross-sectional view of another embodiment of a display device.

FIG. 9 is a cross-sectional view of another embodiment of a display device.

Figure 8:
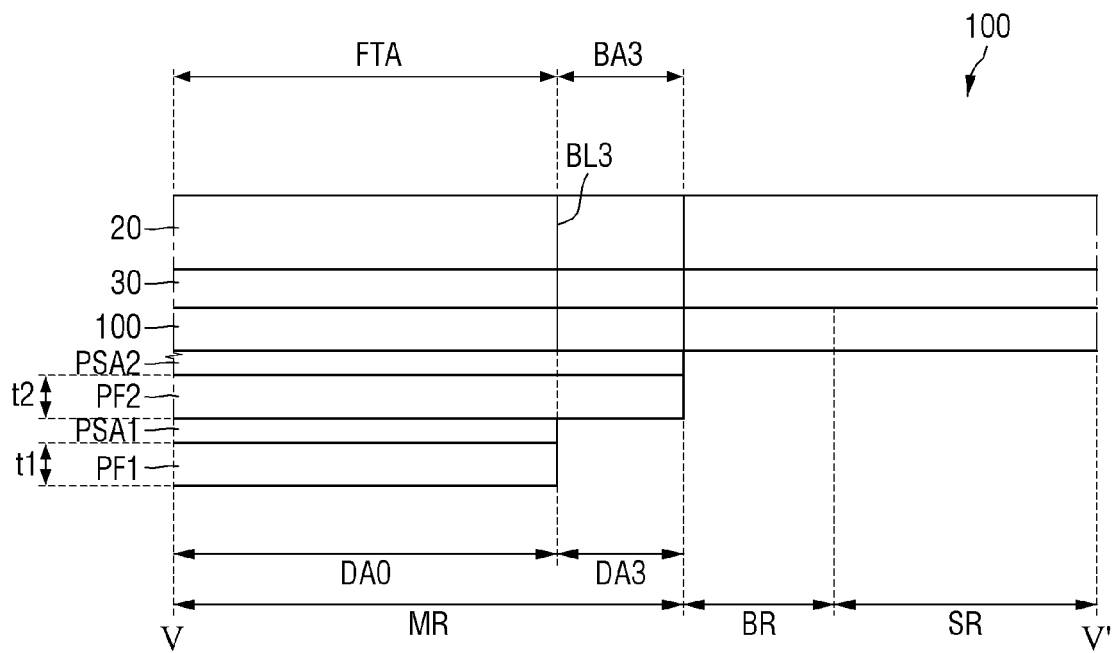
FIG. 8 is a cross-sectional view taken along line V-V' in FIG. 7.

Referring to FIG. 9, a support film PF_1 according to this embodiment is different from the support film PF according to FIG. 3, FIG. 5, and FIG. 8 in that the support film PF_1 is disposed in the flat area FTA and the bent areas BA1, BA2, BA3, and BA4, has a third thickness t3 in the flat area FTA, and has a first thickness t1 in the bent areas BA1, BA2, BA3, and BA4.

More specifically, the support film PF_1 according to this embodiment may be disposed in the flat area FTA and the bent areas BA1, BA2, BA3, and BA4, and may have the third thickness t3 of a portion PF2a in the flat area FTA, and may have the first thickness t1 of a portion PF2b in the bent area BA1, BA2, BA3, and BA4. The first thickness t1 has been described above in FIG. 8, and detailed description thereof is omitted. The third thickness t3 may be equal to a sum of the first thickness t1 and the second thickness t2 as described above in FIG. 8. However, the invention is not limited thereto. The third thickness t3 may be greater than the first thickness t1.

In other words, the support film PF_1 according to this embodiment may consist of a single unitary structure of the lower support film PF1 and the upper support film PF2 described above in FIG. 4.

According to this embodiment, the support film PF_1 is disposed in the flat area FTA, and the bent areas BA1, BA2, BA3, and BA4, has the third thickness t3 in the flat area FTA, and has the first thickness t1 less than the third thickness t3 in the bent areas BA1, BA2, BA3, and BA4. This may prevent deterioration of handleability of the display panel 100, and may achieve suppression of bubble generation in the adhesive member 30 in the bent areas BA1, BA2, BA3, and BA4 of the display panel 100 and suppression of crack generation in the display panel 100 itself.

Figure 10:
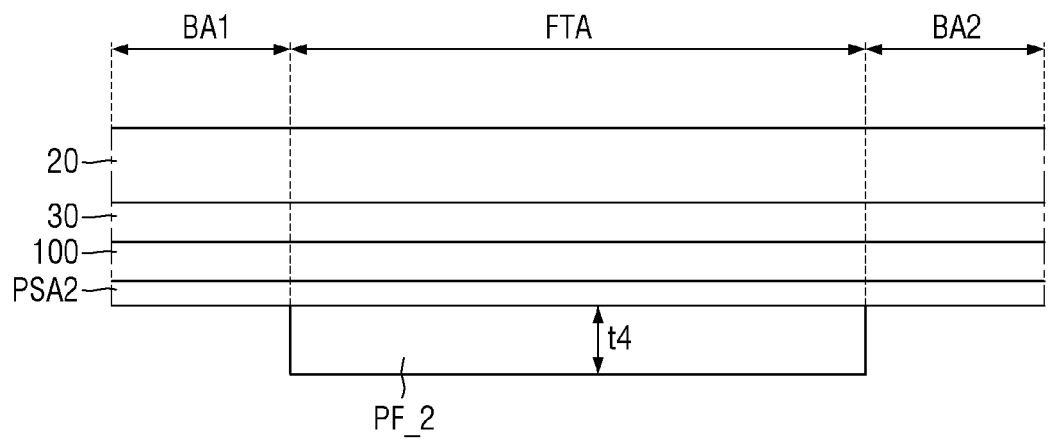
FIG. 10 is a cross-sectional view of another embodiment of a display device.

FIG. 10 is a cross-sectional view of another embodiment of a display device.

Referring to FIG. 10, a support film PF_2 according to this embodiment is different from the support film PF according to FIG. 3, FIG. 5, and FIG. 8 in that the support film PF_2 is disposed only in the flat area FTA.

More specifically, the support film PF_2 may be disposed only in the flat area FTA, and may not be disposed in the bent areas BA1, BA2, BA3, and BA4. The support film PF_2 may be attached to the display panel 100 via the upper adhesive member PSA2. In an embodiment, the support film PF_2 may have a fourth thickness t4. In an embodiment, the fourth thickness t4 may be equal to or less than t3 shown in FIG. 9. The upper adhesive member PSA2 may be disposed in an entirety of the flat area FTA and the bent areas BA1, BA2, BA3, and BA4. However, the invention is not limited thereto. In another embodiment, the upper adhesive member PSA2 may be disposed only in the flat area FTA.

Figure 11:
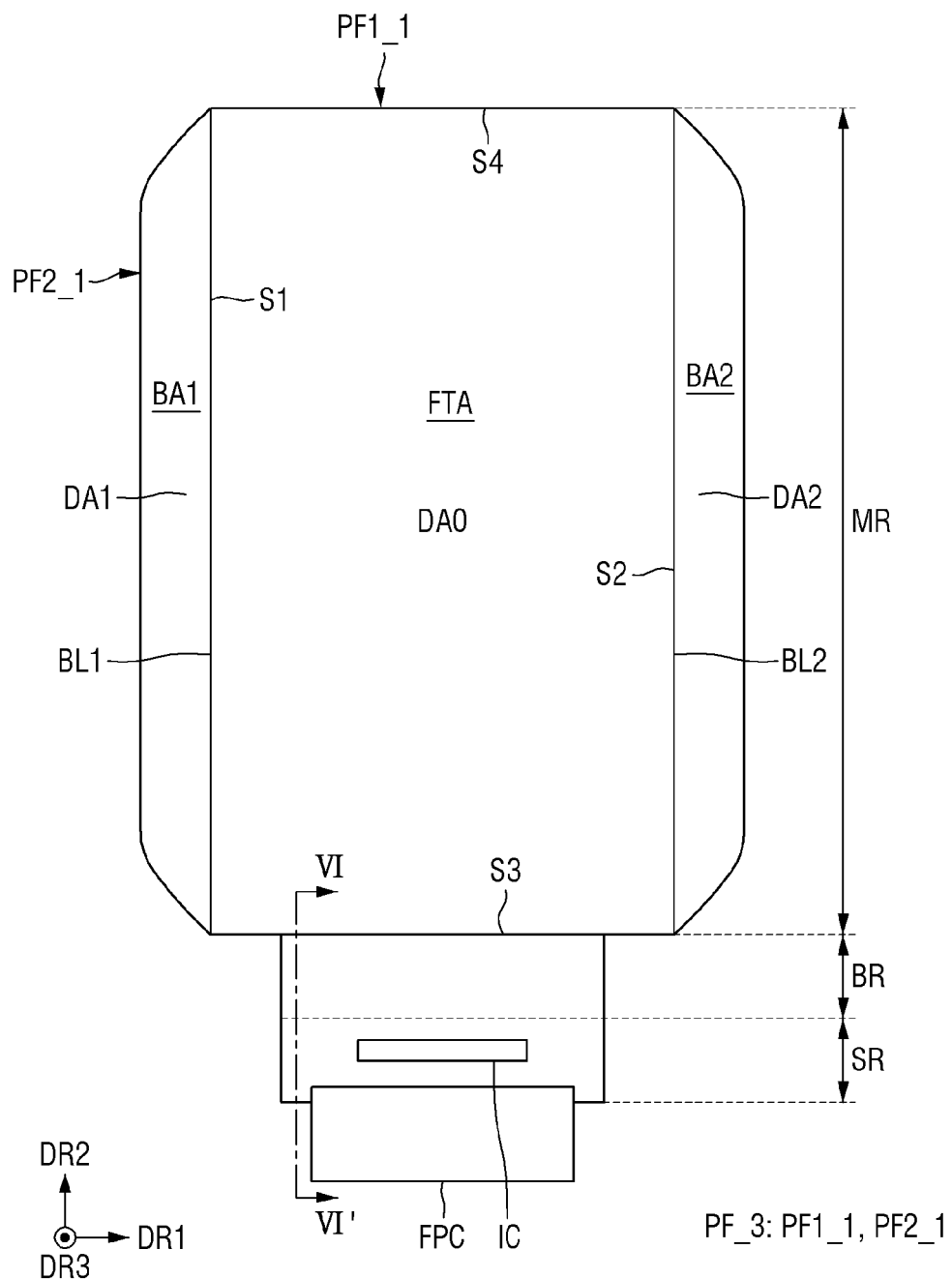
FIG. 11 is a plan view of another embodiment of a display panel and a support film.
Figure 12:
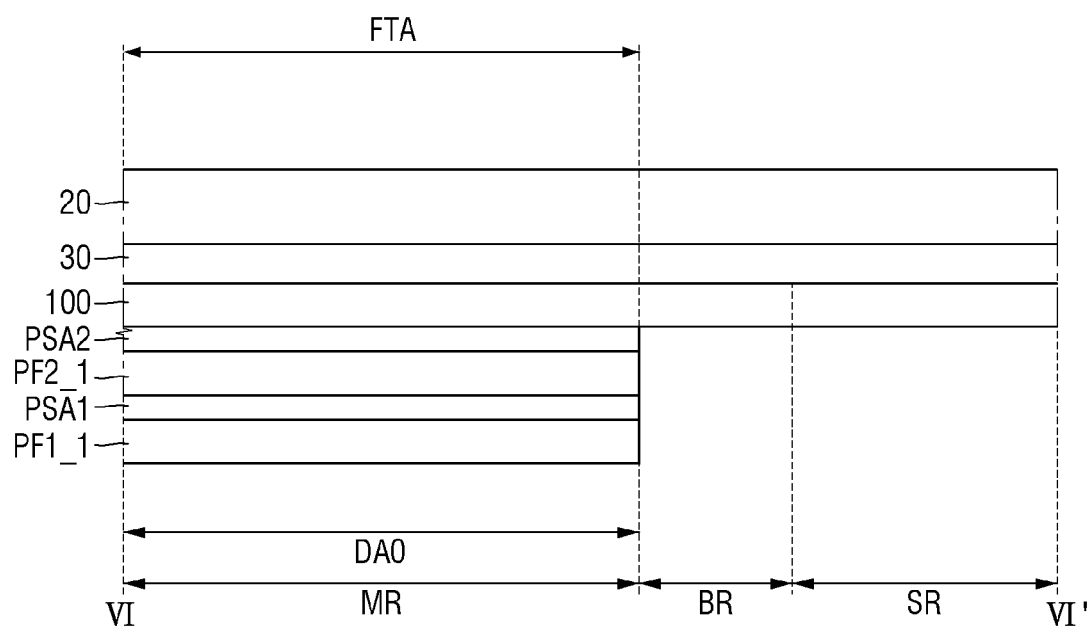
FIG. 12 is a cross-sectional view taken along line VI-VI' of FIG. 11.

FIG. 11 is a plan view of another embodiment of a display panel and a support film. FIG. 12 is a cross-sectional view taken along line VI-VI' of FIG. 11.

Referring to FIG. 11 and FIG. 12, the display device according to this embodiment is different from the display devices according to FIG. 1 and FIG. 7 in that the display device according to this embodiment is free of the third and fourth bent areas BA3 and BA4 (or the third side display area DA3, and the fourth side display area DA4).

More specifically, the display device according to this embodiment may not include the third and fourth bent areas BA3 and BA4 (or the third side display area DA3 and the fourth side display area DA4).

That is, in a plan view, the front display area DA0 may be directly extended from (or connected to) the bent area BR, i.e., an end of the front display area DA0 may be directly extended from (or connected to) the bent area BR. Accordingly, the third bending line BL3 and the fourth bending line BL4 may be absent.

In this embodiment, a planar shape of the lower support film PF1_1 of the support film PF_3 is exactly the same as a planar shape of the flat area FTA. The upper support film PF2_1 is disposed not only in the flat area FTA, but also in the bent areas BA1 and BA2. Thus, the upper support film PF2_1 has a planar shape including the flat area FTA and protruding from the flat area FTA to the bent areas BA1 and BA2, compared to that of the lower support film PF1_1. At a third side S3 and a fourth side S4 of the flat area FTA, a side of the lower support film PF1_1 and a side of the upper support film PF2_1 may be aligned with each other.

Figure 13:
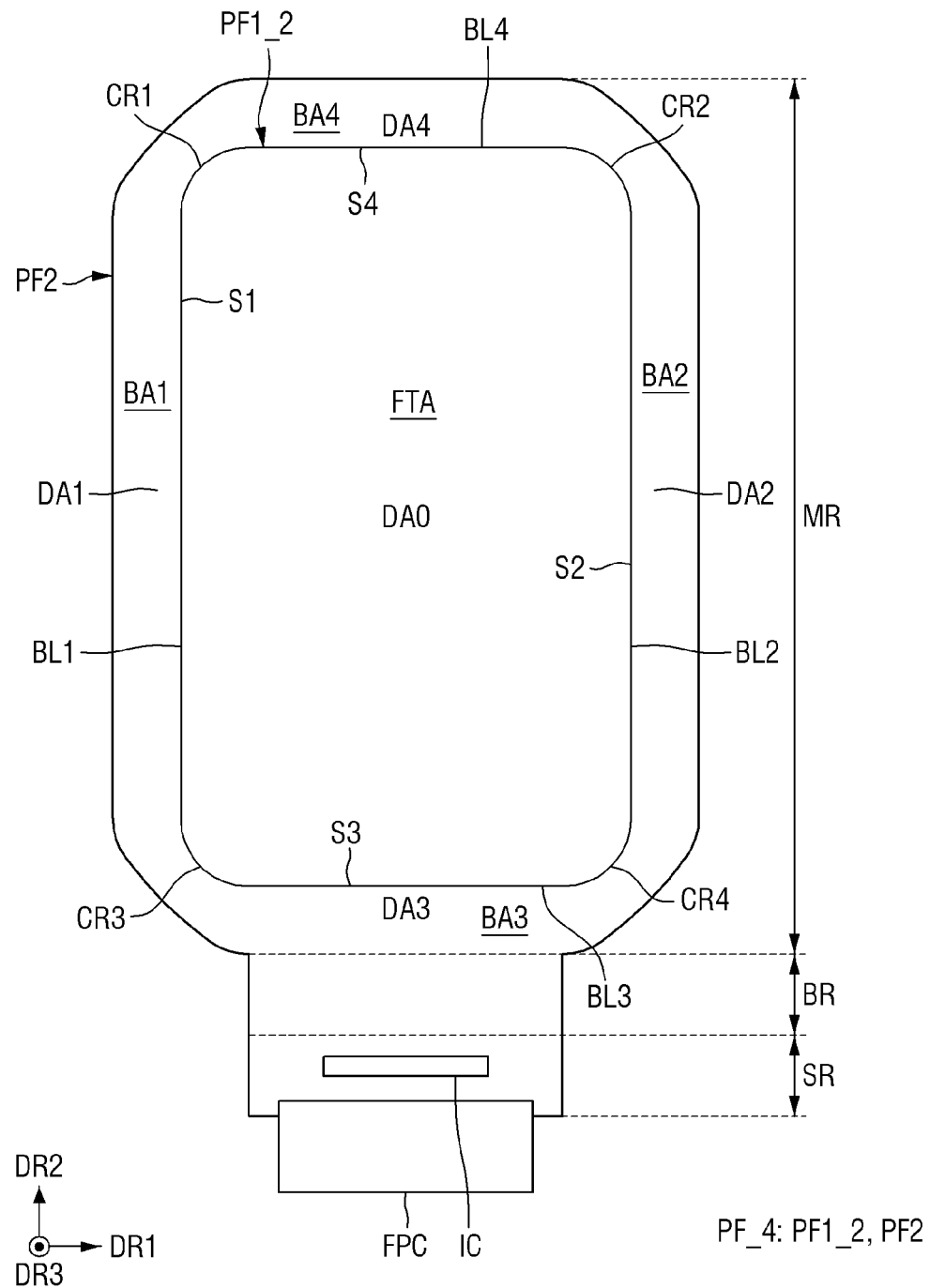
FIG. 13 is a plan view of another embodiment of a display panel and a support film.

FIG. 13 is a plan view of another embodiment of a display panel and a support film.

Referring to FIG. 13, a planar shape of a lower support film PF1_2 of a support film PF_4 according to this embodiment is different from the planar shape of the lower support film PF1 according to FIG. 7 in that the planar shape of the lower support film PF1_2 is a quadrangular (e.g., rectangular) shape with rounded corners. More specifically, the quadrangular (e.g., rectangular) shape with rounded corners as the planar shape of the lower support film PF1_2 of the support film PF_4 has two long-sides S1 and S2 that extend along the second direction DR2, two short-sides S3 and S4 that extend along the first direction DR1, and curved edges CR1, CR2, CR3, and CR4 connecting the long-sides S1 and S2 and the short-sides S3 and S4 to each other.

Further descriptions are described above in FIG. 7, and will be omitted below.

Figure 14:
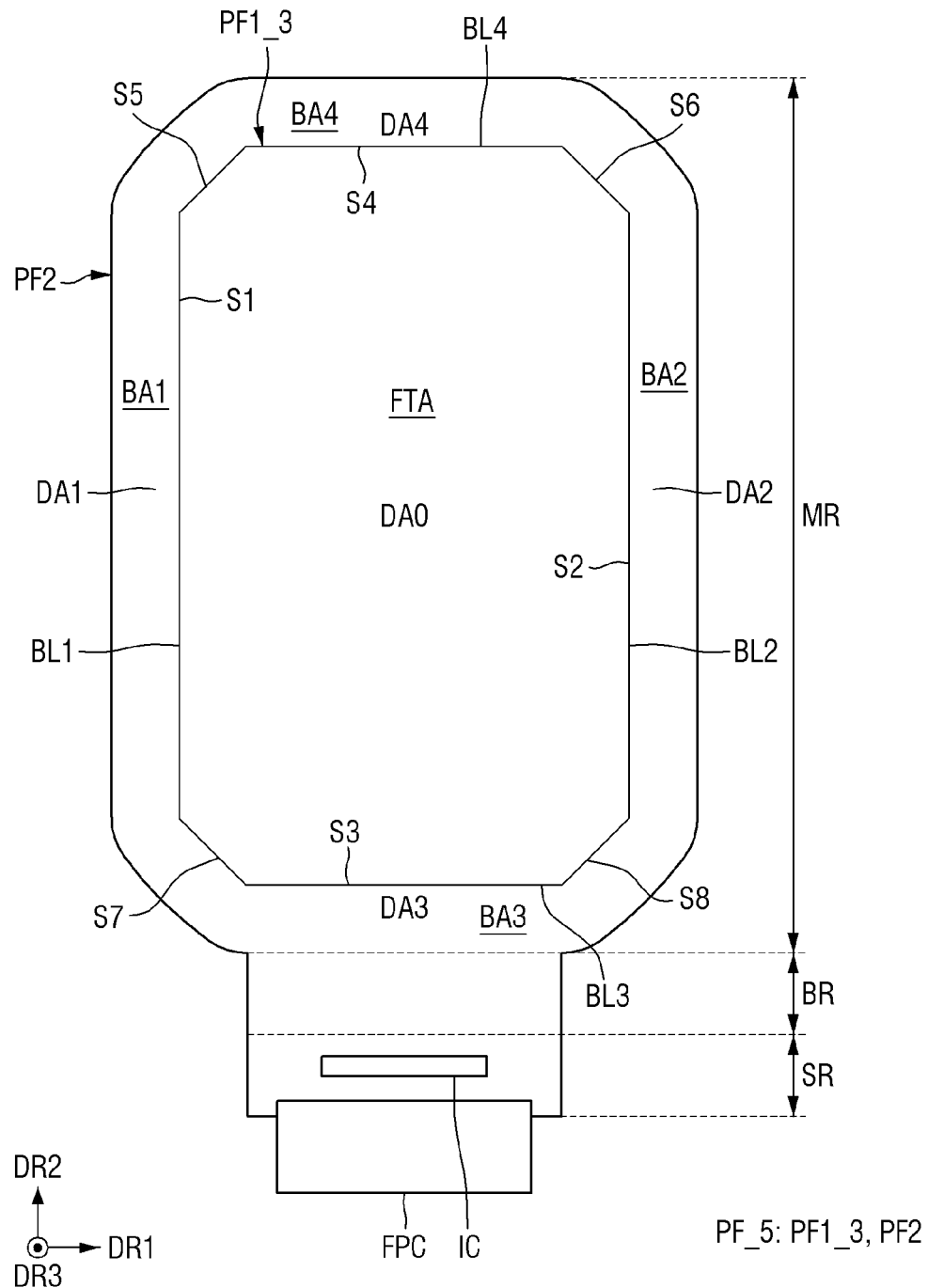
FIG. 14 is a plan view of another embodiment of a display panel and a support film.

FIG. 14 is a plan view of another embodiment of a display panel and a support film.

Referring to FIG. 14, a planar shape of a lower support film PF1_3 of a support film PF_5 according to this embodiment is different from the planar shape of the lower support film PF1 according to FIG. 7 in that each of corners of the planar shape of the lower support film PF1_3 has a chamfered shape.

More specifically, the planar shape of the lower support film PF1_3 of the support film PF_5 has the long-sides S1 and S2 extending along the second direction DR2, the short-sides S3 and S4 extending along the first direction DR1, and linear corners S5, S6, S7, S8 connecting the long-sides S1 and S2 and the short-sides S3 and S4 to each other.

Further descriptions are described above in FIG. 7, and will be omitted below.

Although embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A display device in which a flat area, a first bent area positioned on a side in a first direction of the flat area, and a second bent area positioned on a side in a direction opposite to the first direction of the flat area are defined, the display device comprising:
   a display panel comprising portions respectively overlapping the flat area, the first bent area, and the second bent area, each of the portions of the display panel including a first surface and a second surface opposite to the first surface; and
   a support film disposed on the second surface of the display panel,
   wherein a portion of the support film overlapping the flat area has a first thickness,
   wherein a portion of the support film overlapping each of the first bent area and the second bent area has a second thickness smaller than the first thickness, and
   wherein the support film includes a first support film on the second surface of the display panel overlapping the flat area, and a second support film between the first support film and the display panel.

2. The display device of claim 1, wherein the first support film does not overlap the first bent area, and the second bent area.

3. The display device of claim 2, wherein the second support film overlaps the first bent area, the flat area, and the second bent area.

4. The display device of claim 3, further comprising a first adhesive layer which is disposed between the second support film and the display panel and bonds the second support film and the display panel to each other.

5. The display device of claim 4, wherein the first adhesive layer overlaps the flat area, the first bent area, and the second bent area.

6. The display device of claim 5, further comprising a second adhesive layer which is disposed between the first support film and the second support film and bonds the first support film and the second support film to each other.

7. The display device of claim 6, wherein the second adhesive layer overlaps the flat area, and does not overlap the first bent area and the second bent area.

8. The display device of claim 3, wherein the second support film has the second thickness, and the first support film has a third thickness, wherein each of the second thickness and the third thickness is in a range of 30 micrometers to 40 micrometers.

9. The display device of claim 1, further comprising an adhesive layer which is disposed between the support film and the display panel and bonds the support film and the display panel to each other.

10. The display device of claim 9, wherein the adhesive layer overlaps the flat area, the first bent area, and the second bent area.

11. The display device of claim 1, wherein the portion of the support film overlapping the flat area and the portion of the support film overlapping each of the first bent area and the second bent area are monolithic.

12. A display device in which a flat area, a first bent area positioned on a side in a first direction of the flat area, and a second bent area positioned on a side in a direction opposite to the first direction of the flat area, the display device comprising:
   a display panel comprising portions respectively overlapping the flat area, the first bent area, and the second bent area, each of the portions of the display panel including a first surface and a second surface opposite to the first surface;
   a cover window disposed on the first surface of the display panel and comprising portions respectively overlapping the flat area, the first bent area, and the second bent area; and
   a support film disposed on the second surface of the display panel,
   wherein a portion of the support film overlapping the flat area has a first thickness,
   wherein a portion of the support film overlapping each of the first bent area and the second bent area has a second thickness smaller than the first thickness,
   wherein a first support film on the second surface of the display panel overlapping the flat area, and
   wherein a second support film disposed between the first support film and the display panel and overlapping the first bent area, the flat area, and the second bent area.

13. The display device of claim 12, wherein the cover window includes ultra-thin glass.

14. The display device of claim 12, wherein the first support film does not overlap the first bent area and the second bent area.

15. The display device of claim 12, wherein the portion of the support film overlapping the flat area and the portion of the support film overlapping each of the first bent area and the second bent area are monolithic.

16. A display device in which a flat area, a first bent area positioned on a side in a first direction of the flat area, a second bent area positioned on a side in a direction opposite to the first direction of the flat area, a third bent area positioned on a side in a second direction intersecting the first direction of the flat area, and a fourth bent area positioned on a side in a direction opposite to the second direction of the flat area are defined, the display device comprising:
   a display panel comprising portions respectively overlapping the flat area and the first to fourth bent areas, each of the portions of the display panel including a first surface and a second surface opposite to the first surface; and
   a support film disposed on the second surface of the display panel,
   wherein a portion of the support film overlapping the flat area has a first thickness,
   wherein a portion of the support film overlapping each of the first bent area and the second bent area has a second thickness smaller than the first thickness, and
   wherein the support film includes a first support film on the second surface of the display panel overlapping the flat area, and a second support film between the first support film and the display panel.

17. The display device of claim 16, wherein in a plan view, the display panel includes long-side edges extending along the second direction, short-side edges extending along the first direction, and each of curved edges where each of the long-side edges and each of the short-side edges meet each other,
   wherein in the plan view, a planar shape of the support film is identical with a planar shape of the display panel.

18. The display device of claim 16, wherein in a plan view, the display panel includes long-side edges extending along the second direction, short-side edges extending along the first direction, and each of curved edges where each of the long-side edges and each of the short-side edges meet each other, wherein in the plan view, the support film includes long-side edges extending along the second direction, and short-side edges extending along the first direction.

19. The display device of claim 16, wherein in a plan view, the display panel includes long-side edges extending along the second direction, short-side edges extending along the first direction, and each of curved edges where each of the long-side edges and each of the short-side edges meet each other, wherein in the plan view, the support film includes long-side edges extending along the second direction, short-side edges extending along the first direction, and each of linear corners for connecting each of the long-side edges and each of the short-side edges adjacent to each other to each other.

\* \* \* \* \*